2,965,476
Patented Dec. 20, 1960

2,965,476
LEACHING PROCESS FOR THE RECOVERY OF PURE TITANIUM, ZIRCONIUM AND HAFNIUM

Heinrich Röck, Trostberg, Bavaria, Germany, assignor to Suddeutsche Kalkstickstoff-Werke A.G., Trostberg, Bavaria, Germany No Drawing. Filed Oct. 31, 1958, Ser. No. 770,920
Claims priority, application Germany Jan. 11, 1958
3 Claims. (Cl. 75—84)

The invention relates to improvements in the removal of alkaline earth metals and their oxides from metallic zirconium, hafnium and titanium produced by reduction of their compounds with said alkaline earth metals.

In said reduction, there is obtained a mixture of the desired zirconium, hafnium or titanium with alkaline earth metal oxides and/or chlorides and excess alkaline earth metal. This mixture will be designated hereafter reduction product. Said reduction product is leached with dilute acids to separate the alkaline earths from the obtained refractory metal. Such leaching methods are described, for instance, in British Patents Nos. 664,061; 675,933 and 710,020, and in U.S. Patents Nos. 2,727,817; 2,537,068, and 2,707,679.

An inherent difficulty of the recovery process consists in the risk of dissolving also the refractory metal which is present in the reduction product as a powder offering a large surface to the acid. For this reason, the acid concentration has been kept as low as possible and dilute acid has been used. This has the drawback that large amounts of liquid must be handled and reacted with the reduction product, which seriously affects the economy of the process.

It is a principal object of the invention to provide a separation method eliminating the recited drawback.

Other objects and advantages will be apparent from a consideration of the specification and claims.

According to the invention, the reduction product is dissolved with aqueous concentrated hydrochloric acid of about 32 to 38% by weight of HCl in at least two steps. The first step is carried out at a temperature of about 0 to 50° C. at a pH of 8 to 11, and the second step is carried out generally at somewhat higher temperature than the first step, within the range of 0 to 60° C., at a pH of 2–5 in the presence of $NO_3^-$ ions in a concentration of about 0.1 to 5 percent of the solution. In an after-treatment, hydrochloric acid may be applied to remove any residue of alkaline earth metal compounds.

My method makes it possible to use small amounts of acid in small and economic apparatus without the risk of dissolving the refractory metal. The invention will be described more in detail with reference to the following example.

Example

As starting material, there was used the reduction product obtained by reacting 9 kg. of rutile and 12 kg. of calcium in the presence of 2.3 kg. of calcium chloride, according to Example 3 of the application by Stefan Elischer for "Preparation of Pure Metals of the III B to VI B Groups of the Periodic Table," filed concurrently herewith. 23.5 kg. of said reduction product in lumps not exceeding 10 mm. were charged into a stainless steel vessel equipped with stirrer and cooling jacket. Previously, the vessel had been filled with water in an amount sufficient to allow efficient operation of the stirrer. Conforming to the rate of charging the reduction product, 32% hydrochloric acid was passed through a dip tube into the solution. The excess calcium in the charge reacted very quickly with development of hydrogen. The addition of the hydrochloric acid was so adjusted that the pH was maintained at 8–11, and the temperature was not allowed to exceed 50° C. After the charge of the reduction product was completed, the second step was begun by dissolving the lime and hydrated lime. For this purpose, pH values smaller than 7 had to be used to ensure quick reaction. However, in order to avoid also partial dissolution of the titanium powder which otherwise would take place in acid medium at elevated temperatures, 60% $HNO_3$ was added to the hydrochloric acid in an amount of 1 percent by weight of the hydrochloric acid. In said second stage, the pH was maintained at a value of 2 to 5 and the temperature was not allowed to exceed 60° C.

After the major part of the free lime had been converted to $CaCl_2$, the batch was allowed to settle for ½ hour, whereupon the supernatant concentrated $CaCl_2$ solution was decanted. The residue was stirred with fresh water, and the treatment with concentrated hydrochloric acid+1% concentrated nitric acid at a pH of 2 to 5 with settling and decantation was repeated three times.

Subsequently, the last residues of calcium and lime were dissolved at a pH of 2 to 5 at a temperature of 20 to 30° C. Also in this step, concentrated hydrochloric acid containing 1% of concentrated nitric acid was used with vigorous stirring. The treatment was continued for 10 hours to allow the hydrochloric acid to diffuse into the titanium metal particles and to ensure that all calcium chloride has diffused out of said particles.

Finally, the solution was decanted, and the solid residue was filtered off and washed with very dilute aqueous hydrochloric acid (0.05%).

After drying, 4.53 kg. of crude titanium metal containing 98% of Ti and 0.18% of Ca were obtained in a yield of 85 percent. The total consumption of acid was 48.75 liter of 32% HCl and 1 liter of 60% $HNO_3$.

Instead of nitric acid, nitrates such as sodium nitrate, potassium nitrate, or calcium nitrate may be used to furnish the $NO_3^-$ ions which reduce the corroding action of the hydrochloric acid on the refractory metal particles.

The same procedure can be applied to leach the reaction products of the metallothermic zirconium or hafnium oxide reduction with alkaline earth metals.

I claim:

1. A method of recovering pure refractory metal selected from the group consisting of titanium, zirconium and hafnium from the product obtained by the metallothermic reduction of the oxides of said metals with alkaline earth metals, said method comprising treating said product in a first step with hydrochloric acid of about 32 to 38% HCl at a pH of 8 to 11 and a temperature of about 0 to 50° C. until the alkaline earth metal contained in said product is substantially dissolved, then dissolving the alkaline earth metal compounds with hydrochloric acid of about 32 to 38% HCl containing about 0.1 to 5 percent of $NO_3^-$ ions at a pH of 2 to 5 and a temperature somewhat higher than in the preceding step but not exceeding about 60° C., and separating the solutions of alkaline earth chlorides from the remaining refractory metal.

2. The method claimed in claim 1 wherein in said first step said product and said hydrochloric acid are fed continuously into a cooled leaching vessel.

3. The method claimed in claim 1 comprising, in addition, a final treatment at 0 to 30° C. with hydrochloric acid.

References Cited in the file of this patent

UNITED STATES PATENTS

| | | |
|---|---|---|
| 1,602,542 | Marden | Oct. 12, 1926 |
| 2,834,667 | Rostrom | May 13, 1958 |
| 2,864,690 | Lee et al. | Dec. 16, 1958 |